(12) United States Patent
Park et al.

(10) Patent No.: US 8,520,985 B2
(45) Date of Patent: Aug. 27, 2013

(54) MACH-ZEHNDER MODULATOR

(75) Inventors: Jeong Woo Park, Daejeon (KR); Gyungock Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 260 days.

(21) Appl. No.: 12/975,161

(22) Filed: Dec. 21, 2010

(65) Prior Publication Data

US 2012/0027336 A1 Feb. 2, 2012

(30) Foreign Application Priority Data

Aug. 2, 2010 (KR) .................. 10-2010-0074715

(51) Int. Cl.
*G02F 1/025* (2006.01)
*G02F 1/035* (2006.01)

(52) U.S. Cl.
USPC ............................................................ 385/3

(58) Field of Classification Search
USPC ............................................................ 385/3
See application file for complete search history.

(56) References Cited

U.S. PATENT DOCUMENTS

| | | | |
|---|---|---|---|
| 5,193,128 A | 3/1993 | Farina et al. | |
| 5,908,305 A | 6/1999 | Crampton et al. | |
| 7,116,853 B2 | 10/2006 | Gunn, III et al. | |
| 7,187,837 B2 | 3/2007 | Gothoskar et al. | |
| 7,251,408 B1 | 7/2007 | Gunn, III et al. | |
| 7,280,712 B2 | 10/2007 | Liu | |
| 7,321,702 B2 * | 1/2008 | Akiyama et al. | 385/3 |
| 2010/0002978 A1 | 1/2010 | Park et al. | |
| 2010/0278477 A1 | 11/2010 | Park et al. | |

FOREIGN PATENT DOCUMENTS

| KR | 1020050114696 A | 12/2005 |
|---|---|---|
| KR | 100772538 B1 | 10/2007 |

OTHER PUBLICATIONS

Ansheng Liu et al., "High-speed optical modulation based on carrier depletion in a silicon waveguide", Optics Express, 2007, pp. 660-668, vol. 15 No. 2, OSA.

* cited by examiner

*Primary Examiner* — Omar Rojas (57) ABSTRACT

Provided is a Mach-Zehnder modulator. The Mach-Zehnder modulator comprises an input wave guide and an output wave guide arranged on a substrate, a first branch wave guide and a second branch wave guide connected in parallel between the input and output wave guides, and a connecting region configured to connect the first branch wave guide and the second branch wave guide. Each of the first and second branch wave guides comprises first doped regions doped with a first dopant and second doped regions doped with a second dopant having different conductivity from the first dopant, and the connecting region is doped with the first dopant and arranged between the first regions of the first and second branch wave guides.

16 Claims, 4 Drawing Sheets

MACH-ZEHNDER MODULATOR

CROSS-REFERENCE TO RELATED APPLICATIONS

This U.S. non-provisional patent application claims priority under 35 U.S.C. §119 of Korean Patent Application No. 10-2010-0074715, filed on Aug. 2, 2010, the entire contents of which are hereby incorporated by reference.

BACKGROUND OF THE INVENTION

The present invention disclosed herein relates to an optical modulator, and more particularly, to a Mach-Zehnder modulator using light interference.

Generally, the optical modulator is an optoelectronic device which loads electric data on light. The optical modulator may broadly comprise an Electro-Absorption (EA) modulator and the Mach-Zehnder modulator. Since the Mach-Zehnder modulator has better signal quality than the EA modulator, it is widely used for high speed optical communications of 2.5 Gbps or higher.

SUMMARY OF THE INVENTION

The present invention provides a small-sized Mach-Zehnder modulator.

The present invention also provides a Mach-Zehnder of high speed and high efficiency.

Embodiments of the present invention provide Mach-Zehnder modulators comprising an input wave guide and an output wave guide arranged on a substrate; a first branch wave guide and a second branch wave guide connected in parallel between the input and output wave guides; and a connecting region configured to connect the first branch wave guide and the second branch wave guide, wherein each of the first and second branch wave guides comprises first doped regions doped with a first dopant and second doped regions doped with a second dopant having different conductivity from the first dopant, and the connecting region is doped with the first dopant and arranged between the first regions of the first and second branch wave guides.

In some embodiments, the Mach-Zehnder modulator may further comprise a slab arranged on the substrate and a rib protruding from the slab, wherein the first and second branch wave guides may be provided to the slab and the rib, and the connecting region may be provided to the slab between the first and second branch wave guides. The rib may define the input/output wave guides, and the first and second branch wave guides. The light may travel along the rib and the slab under the rib. The first and second branch wave guides and the first doped regions may be connected to each other by the connecting region. The slab between the first and second branch wave guides may be doped with the first dopant. Also, the whole slab may be doped with the first dopant. The first and second doped regions of the first branch wave guide may become the first dynamic phase shifter. The first and second doped regions of the second branch wave guide may become the second dynamic wave guide. The first doped regions of the first and second dynamic phase shifters may be electrically connected by doping of the first dopant.

In other embodiments, the Mach-Zehnder modulator may further comprise a common electrode formed on the connecting region between the first and second branch wave guides. Also, in the case that the whole slab is doped with the first dopant, the common electrode may be arranged at any position on the slab outside of the first and second branch wave guides. The first and second dynamic phase shifters may share the common electrode.

In still other embodiments, the Mach-Zehnder modulator may further comprise first and second electrodes electrically connected to the second doped regions of each of the first and second branch wave guides. The first dynamic phase shifter may be operated by high frequency power applied to the first electrode and the common electrode. The first dynamic phase shifter may be operated by high frequency power applied to the second electrode and the common electrode.

In even other embodiments, the first branch wave guide may comprise a first junction which corresponds to a boundary surface of the first and second doped regions, and the second branch wave guide may comprise a second junction which corresponds to a boundary surface of the first and second doped regions. The first dynamic phase shifter may comprise the first junction, and the second dynamic phase shifter may comprise the second junction. The first and second junctions may comprise a forward or reverse voltage by the high frequency power. The first and second junctions may induce first and second depletion regions. The first and second dynamic phase shifters may comprise the first and second depletion regions induced from the first and second junctions by opposite voltages.

In yet other embodiments, the first and second junctions may not be parallel to the substrate. The first and second junctions may be vertically arranged at the substrate.

In further embodiments, the first and second junctions may be provided within the slab and the rib of each of the first and second branch wave guides. The first and second junctions may be arranged in a vertical direction to the slab and ribs.

In still further embodiments, the second doped regions may be extended to the slab facing to the connecting region of the first and second branch wave guides. They may be arranged as a PNP or NPN structure from the first dynamic phase shifter to the second dynamic phase shifter.

In even further embodiments, the first and second electrodes may be arranged on the second doped regions. The first and second electrodes may be contacted on the second doped regions of both sides of the first and second branch wave guides.

In yet further embodiments, the first and second junctions may be parallel to the substrate. The first and second junctions may be arranged in a vertical direction.

In much further embodiments, the first and second junctions may be arranged within the rib of each of the first and second branch wave guides. The first and second junctions may be arranged in a horizontal direction within the rib on the slab.

In still much further embodiments, the first and second electrodes may be provided on the rib of the first and second branch wave guides respectively.

In even much further embodiments, the Mach-Zehnder modulator may further comprise a static phase shifter arranged at one of the first and second branch wave guides. The static phase shifter may change a phase of the light which travels through one of the first and second branch wave guides as much as $\pi/2$.

In yet much further embodiments, the static phase shifter may comprise an intrinsic semiconductor part intersecting with one of the first and second branch wave guides and first and second semiconductor parts arranged at both sides of the intrinsic semiconductor part.

In yet much further embodiments, the intrinsic semiconductor part may comprise the rib of one of the first and second branch wave guides and the slab under the rib. The first and second semiconductor parts may be arranged at the slab which is adjacent to one of the first and second branch wave guides.

In yet much further embodiments, one of the first and second semiconductor parts may be doped with the first dopant, and the other may be doped with the second dopant having different conductivity from the first dopant. The static phase shifter may have the PIN structure.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. Merits and features of the present invention and a method for obtaining them will be clear by referencing the fully described embodiments with the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art, and the present invention is just defined by the scope of the claims. Throughout the specification and drawings, like reference numerals refer to like elements.

The terms used in the specification are not to limit the scope of the present invention but to explain the embodiments. The terms of a singular form include plural forms unless otherwise specified. The meaning of "include," "comprise," "including," or "comprising," specifies a property, a region, a fixed number, a step, a process, an element and/or a component but does not exclude other properties, regions, fixed numbers, steps, processes, elements and/or components. Also, since the description is according to the preferred embodiments, the reference numerals presented according to an order of the description are not limited to the order.

Hereinafter, it will be described about an exemplary embodiment of the present invention in conjunction with the accompanying drawings.

Figure 1:
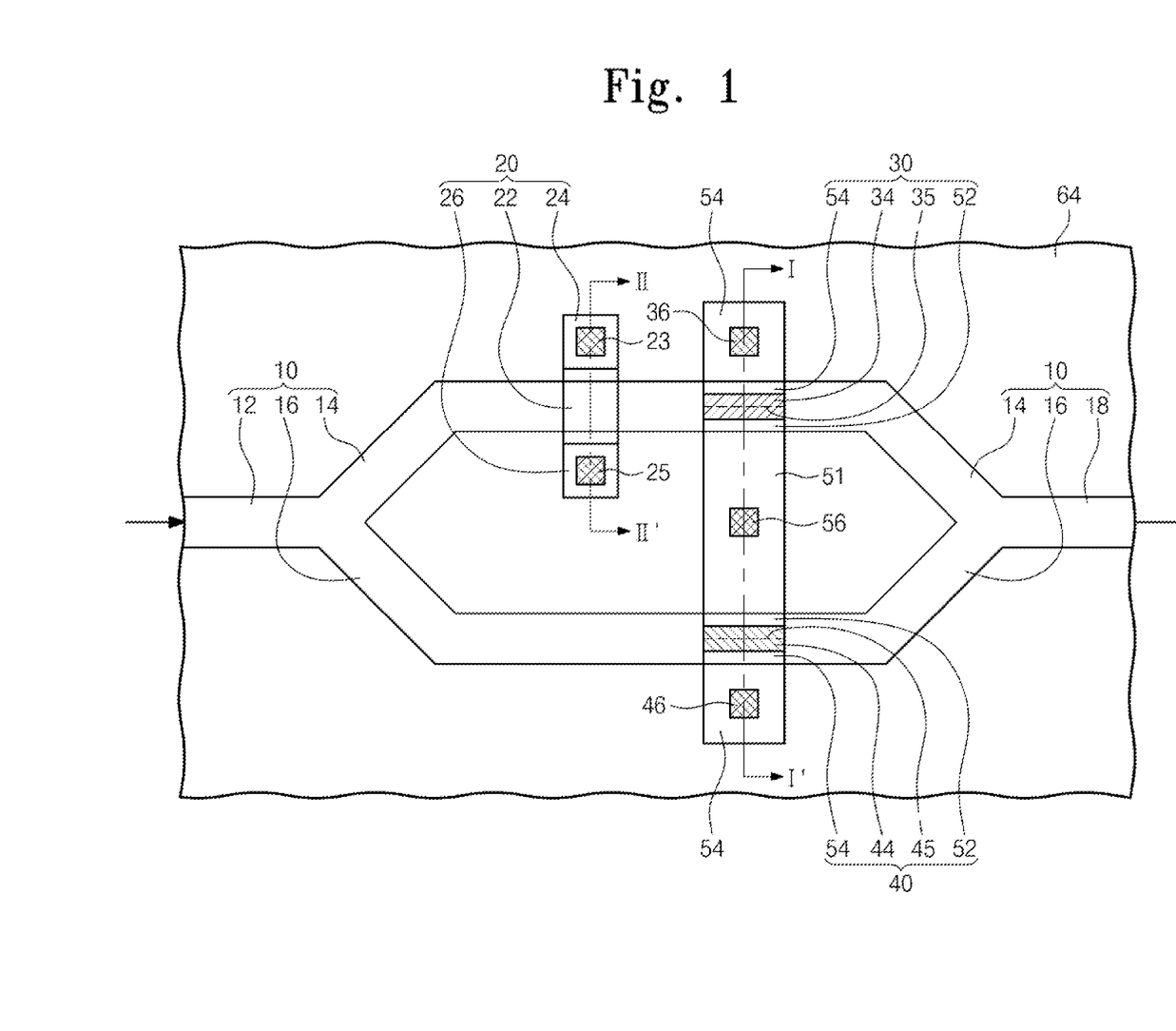
FIG. 1 is a plane view illustrating a Mach-Zehnder modulator according to a first embodiment of the present invention.
Figure 2:
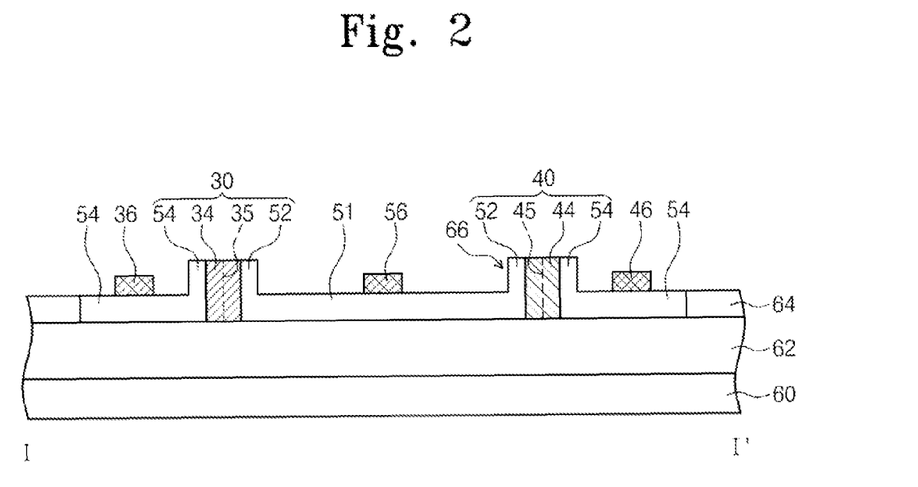
FIGS. 2 and 3 are cross-sectional views illustrating sections of the Mach-Zehnder modulator along lines I-I and II-II of FIG. 1 respectively.
Figure 3:
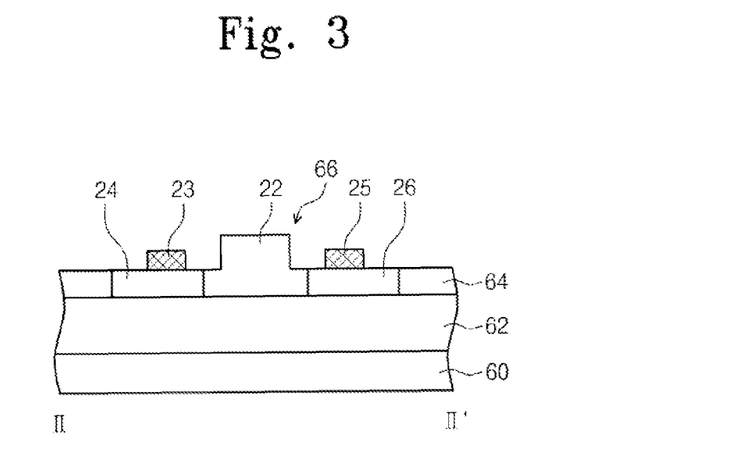

FIG. 1 is a plane view illustrating a Mach-Zehnder modulator according to a first embodiment of the present invention. FIGS. 2 and 3 are cross-sectional views illustrating sections of the Mach-Zehnder modulator along lines I-I and II-II of FIG. 1 respectively.

Referring to FIGS. 1 to 3, the Mach-Zehnder modulator according to the first embodiment of the present invention may comprise first and second dynamic phase shifters 30 and 40 commonly coupled to a connecting region 51 between first and second branch wave guides 14 and 16 of an optical wave guide 10.

The first branch wave guide 14 may comprise the first dynamic phase shifter 30, and the second branch wave guide 16 may comprise the second dynamic phase shifter 40. The first and second dynamic phase shifters 30 and 40 may respectively comprise first and second doped regions 52 and 54 arranged at the first and second branch wave guides 14 and 16. Also, the first and second dynamic phase shifters 30 and 40 may respectively comprise first and second junctions 35 and 45 which correspond to a boundary surface between the first and second doped regions 52 and 54. The first and second junctions 35 and 45 may be parallel to each other. The first and second doped regions 52 and 54 may be doped with first and second dopants having different conductivity. As seen in the figures, first doped regions 52 and second doped regions 54 may be arranged on first and second sides of the connecting region 51. The connecting region 51 may be doped with the first dopant having the same conductivity as the first doped region 52. Each of the first and second dopants may comprise p-type and n-type dopants having different conductivity. For instance, the first and second doped regions 52 and 54 may be arranged as a PNP structure or an NPN structure from the first dynamic phase shifter 30 to the second dynamic phase shifter 40. The first and second dynamic phase shifters 30 and 40 share the connecting region 51 which connects the first and second branch wave guides 14 and 16. Accordingly, the Mach-Zehnder modulator according to the first embodiment of the present invention may become smaller.

The optical wave guide 10 may comprise crystalline silicon. The optical wave guide 10 may comprise an input wave guide 12 and an output wave guide 18 where light travels, and the first and second branch wave guides 14 and 16 connected to each other in parallel between the input and output wave guides 12 and 18.

The optical wave guide 10 may comprise a slab 64 on a substrate 60 and a rib 66 which protrudes from the slab 64 having a step height. The slab 64 may be evenly arranged in front of the substrate 60. The rib 66 may define the input and output wave guides 12 and 18, and the first and second branch wave guides 14 and 16 of the optical wave guide 10 on the slab 64. The light may travel along the rib 66 and the slab 64 under the rib 66 of the optical wave guide 10. The slab 64 may comprise the connecting region 51 doped with the first dopant between the first and second branch wave guides 14 and 16. The slab 64 may comprise the second doped regions 54 doped with the second dopant at the outside of the first and second branch wave guides 14 and 16. The rib 66 may comprise the first doped regions 52 contacted with the connecting region 51, and the second doped regions 54 outside of the first and second branch wave guides 14 and 16.

The substrate 60 may comprise a clad layer 62. The substrate 60 may comprise a Silicon On Insulator (SOI) substrate. The optical wave guide 10 may have a higher refractive index than the clad layer 62. The light may travel along the optical wave guide 10 which has the higher refractive index than the clad layer 62. The clad layer 62 may comprise a silicon oxide layer arranged at the substrate 60. The clad layer 62 may comprise the silicon oxide layer for which oxygen has been selectively ion injected to the crystalline silicon substrate 60 or oxidized.

The first and second dynamic phase shifters 30 and 40 may comprise the first and second doped regions 52 and 54 arranged within the first and second branch wave guides 14 and 16, and the first and second junctions 35 and 45 between the first and second doped regions 52 and 54. The first doped regions 52 of the first and second dynamic phase shifters 30 and 40 may be connected to each other by the connecting region 51 of the slab 64 arranged between the first and second branch wave guides 14 and 16. The first doped regions 52 and the connecting region 51 may be doped with the first dopant of about $1\times10^{17}$ EA/cm$^3$, and the second doped regions 54 may be doped with the second dopant of about $1\times10^{17}$ EA/cm$^3$. The first and second junctions 35 and 45 may be arranged in parallel to the substrate 60. The first and second junctions 35 and 45 may be respectively arranged at the slab 64 and the rib 66 of the first and second branch wave guides 14 and 16. The first and second junctions 35 and 45 may be arranged in parallel to each other.

A common electrode 56 may be arranged on the connecting region 51 between the first and second branch wave guides 14 and 16. The connecting region 51 and the common electrode 56 may be ohmic contacted. First and second signal electrodes 36 and 46 may be arranged on the second doped regions 54. Likewise, the second doped regions 54 and the first and second signal electrodes 36 and 46 may be ohmic contacted. Accordingly, since the common electrode 56 arranged between the first and second signal electrodes 36 and 46 is shared with the first and second dynamic phase shifters 30 and 40, the Mach-Zehnder modulator according to the first embodiment of the present invention may become smaller.

The first and second dynamic phase shifters 30 and 40 may be applied with high frequency alternating current power having opposite potentials centering around the common electrode 56. For instance, if a voltage of about 1.6V is applied to the common electrode 56, voltages of about 3.2V and 0V may be respectively applied to the first and second signal electrodes 36 and 46. If a voltage of about 1.6V is loaded between the first signal electrode 36 and the common electrode 56, a voltage of about –1.6V may be loaded between the second signal electrode 46 and the common electrode 56. On the contrary, if a voltage of about –1.6V is loaded between the first signal electrode 36 and the common electrode 56, a voltage of about 1.6V may be loaded between the second signal electrode 46 and the common electrode 56.

The first and second dynamic phase shifters 30 and 40 may change a phase of the light which travels through the first and second branch wave guides 14 and 16 of the optical wave guides 10. The first and second dynamic phase shifters 30 and 40 may change the phase of the light by difference of the refractive index generated due to charges concentrated at the first and second junctions 35 and 45. The first and second dynamic phase shifters 30 and 40 may comprise first and second depletion regions 34 and 44 induced from the first and second junctions 35 and 45.

The first depletion region 34 may be induced from the first junction 35 by a reverse voltage applied to the common electrode 56 and the first signal electrode 36. The first depletion region 34 may be smaller than a line width of the first branch wave guide 14 of the optical wave guide 10. A charge of density from about $5\times10^{16}$ EA/cm$^3$ to about $5\times10^{17}$ EA/cm$^3$ may be concentrated to the first depletion region 34. The light which travels through the optical wave guide 10 may correspond to a wave function ($\psi$) of Exp(i(kx–wt)). The wave function of the light considering the phase according to the refractive index may be expressed as Equation (1) at the first depletion region 34.

$$\psi_1 = \text{Exp}\left(i\left(\frac{2\pi(n+\Delta n)}{\lambda}x - wt\right)\right) \quad (1)$$

At the first depletion region 34, the phase of the light may comprise $2\pi(n+\Delta n)/\lambda$ which corresponds to k factor of the wave function. n is the refractive index of the first branch wave guide 14 which has the crystalline silicon material, and $\Delta n$ is a variance or a difference of the refractive index between the first depletion region 34, where the charge quantity has been more increased than the first doped region 52 and the second doped region 54 at the crystalline silicon, and the first branch wave guide 14. $\lambda$ is a wave length of the light which passes through the first depletion region 34. w is an inverse number of the wave length and may be correspond to a frequency of the light. Accordingly, the light may travel along the first branch wave guide 14 having the phase which has been changed as much as the refractive index difference between the first depletion region 34 of the first dynamic phase shifter 30 and the first branch wave guide 14.

The second depletion region 44 may be induced from the second junction 45 by a forward voltage applied to the common electrode 56 and the second signal electrode 46. If the forward voltage is applied to the first doped region 52 and the second doped region 54 at the both sides of the second junction 45, the second depletion region 44 has a smaller line width or distance than the first depletion region 34. On the contrary, if the reverse voltage is applied to the first doped region 52 and the second doped region 54 at the both sides of the second junction 45, the second depletion region 44 has a larger line width or distance than the first depletion region 34. Herein, the second depletion region 44 may smaller than a line width of the second branch wave guide 16 of the optical wave guide 10. A charge of density from about $5\times10^{16}$ EA/cm$^3$ to about $5\times10^{17}$ EA/cm$^3$ may be concentrated to the second depletion region 44. The wave function of the light at the second depletion region 44 may be expressed as Equation (2).

$$\psi_2 = \text{Exp}\left(i\left(\frac{2\pi(n-\Delta n)}{\lambda}x - wt\right)\right) \quad (2)$$

At the second depletion region 44, the phase of the light may comprise $2\pi(n-\Delta n)/\lambda$. n is the refractive index of the second branch wave guide 16, and $\Delta n$ is a variance or a difference of the refractive index between the second depletion region 44, where the charge quantity has been more reduced than the first doped region 52 and the second doped region 54 at the crystalline silicon, and the second branch wave guide 16. $\lambda$ is the wave length of the light which passes through the second depletion region 44. w is the inverse number of the wave length and may be correspond to the frequency of the light. Accordingly, the light may travel along the second branch wave guide 16 having the phase which has been changed as much as the refractive index difference between the second depletion region 44 and the second branch wave guide 16.

A difference between the wave functions of the light at the first and second dynamic phase shifters 30 and 40 may be expressed as Equation (3).

$$\psi_1 - \psi_2 = \text{Exp}\left(i\left(\frac{2\pi \times 2\Delta n}{\lambda}x - wt\right)\right) \quad (3)$$

The light may have a phase difference of about $2\pi \times 2\Delta n/\lambda$ according to the difference of the wave functions. Eventually, the light may have the phase difference which is proportional to a double of the refractive index difference ($2\Delta n$) at the first and second dynamic phase shifters 30 and 40. The light whose phases have been respectively changed at the first and second dynamic phase shifters 30 and 40 may be interfered at the output wave guide 18 of the optical wave guide 10 where the first and second branch wave guides 14 and 16 are joined. The light may be outputted from the output wave guide 18 always having the phase difference which corresponds to the double of the refractive index difference through the first and second phase shifters 30 and 40.

The refractive index difference ($\Delta n$) at the first and second dynamic phase shifters 30 and 40 of the silicon material may be expressed as Equation (4).

$$\Delta n = -[8.8 \times 10^{-22} \times \Delta N + 8.5 \times 10^{-18} \times (\Delta P)^{0.8}] \quad \ldots (4)$$

Herein, $\Delta N$ and $\Delta P$ may respectively comprise electron and hole variance quantities per unit cube ($cm^3$). Accordingly, the refractive index difference may be increased in proportion to the variance quantities of the electron and hole.

A static phase shifter 20 may be arranged at one of the first and second branch wave guides 14 and 16. The static phase shifter 20 may differentiate a signal at the output wave guide 18 from the light whose phase is changed through the first and second dynamic phase shifters 30 and 40 respectively disposed at the first and second branch wave guides 14 and 16. For instance, the static phase shifter 20 may be disposed at the first branch wave guide 14. The static phase shifter 20 may comprise an intrinsic semiconductor part 22, a first semiconductor part 24 and a second semiconductor part 26. The intrinsic semiconductor part 22 may intersect with the first branch wave guide 14 of the optical wave guide 10 between the first and second semiconductor parts 24 and 26. Also, the intrinsic semiconductor part 22 may have the substantially same height as the first branch wave guide 14 of the optical wave guide 10. The intrinsic semiconductor part 22 may have the same crystalline silicon as the optical wave guide 10.

The first and second semiconductor parts 24 and 26 may be arranged at the slab 64 which is adjacent to the first and second branch wave guides 14 and 16. The first and second semiconductor parts 24 and 26 may be doped with different dopants. For instance, the first semiconductor part 24 may be doped with the p-type dopant, and the second semiconductor part 26 may be doped with the n-type dopant. Accordingly, the static phase shifter 20 may comprise a PIN structure.

First and second electrostatic electrodes 23 and 25 may be respectively arranged on the first and second semiconductor parts 24 and 26. Direct current power may be applied to the first and second electrostatic electrodes 23 and 25. The refractive index may be adjusted according to density of the charge which passes through the intrinsic semiconductor part 22 in proportion to the current of the power applied to the first and second electrostatic electrodes 23 and 25. The phase of the incident light divided into the first branch wave guide 14 and the second branch wave guide 16 at the input wave guide 12 of the optical wave guide 10 may be asymmetrically changed by the static phase shifter 20. For instance, the static phase shifter 20 may change the phase of the light which travels through the first branch wave guide 14 as much as $\pi/2$.

The light inputted to the input wave guide 12 of the optical wave guide 10 may be separated by the first and second branch wave guides 14 and 16 respectively. Also, the light may be destructively interfered or constructively interfered at the output wave guide 18 by signals inputted to the first and second dynamic phase shifters 30 and 40 at the first and second branch wave guides 14 and 16.

In response to a signal 1, the first and second dynamic phase shifters 30 and 40 may change the phase of the light as much as $\pi/4$ and $-\pi/4$ respectively. At the first branch wave guide 14, the light may be changed to a phase of $3\pi/4$. $3\pi/4$ is a value added $\pi/2$ and $\pi/4$ at the static phase shifter 20 and the first dynamic phase shifter 30 respectively. Also, at the second branch wave guide 16, the light may be changed to a phase of $-\pi/4$ by the second dynamic phase shifter 40. Since a phase difference of the light which has respectively passed through the first and second branch wave guides 14 and 16 is $\pi$, the light may be extinct by the destructive interference.

On the contrary, in response to a signal 0, the first and second dynamic phase shifters 30 and 40 may change the phase of the light as much as $-\pi/4$ and $\pi/4$ respectively. At the first branch wave guide 14, the light may be changed to a phase of $\pi/4$. $\pi/4$ is a value added $\pi/2$ and $-\pi/4$ at the static phase shifter 20 and the first dynamic phase shifter 30 respectively. Also, at the second branch wave guide 16, the light may be changed to a phase of $\pi/4$ by the second dynamic phase shifter 40. Since the light which has passed through the first and second branch wave guides 14 and 16 has the same phase of $\pi/4$, amplitude of the light may be increased by the constructive interference.

Accordingly, the Mach-Zehnder modulator according to the first embodiment of the present invention can modulate the light which travels through the optical wave guide 10 with high speed and high efficiency by using the high frequency power applied to the first and second dynamic phase shifters 30 and 40.

Figure 4:
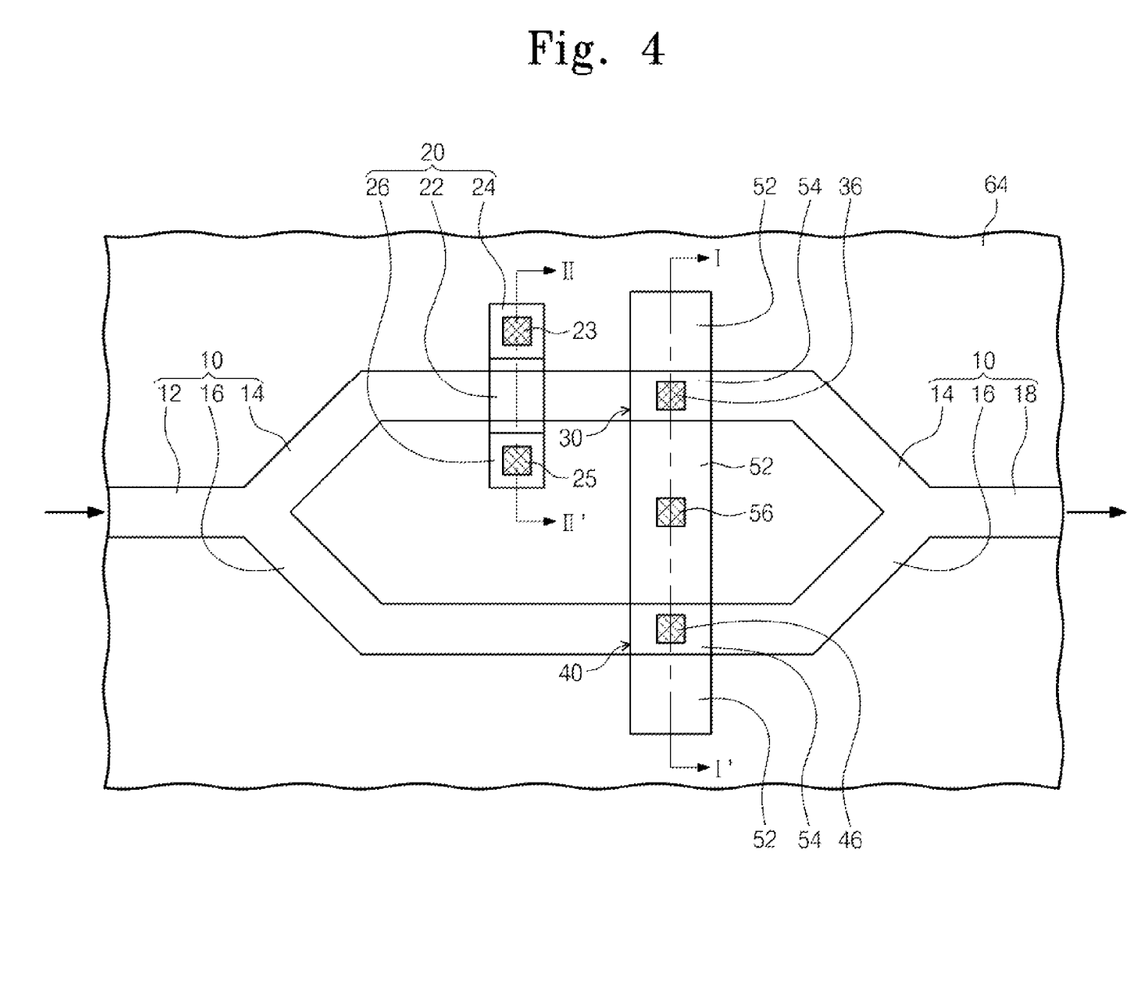
FIG. 4 is a plane view illustrating a Mach-Zehnder modulator according to a second embodiment of the present invention.
Figure 5:
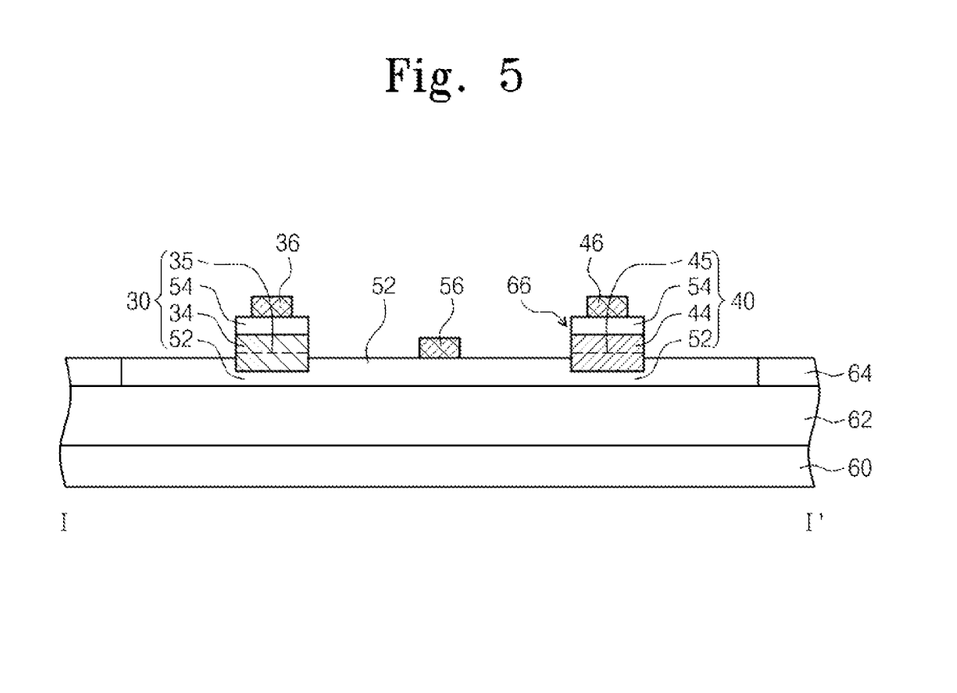
FIGS. 5 and 6 are cross-sectional views illustrating sections of the Mach-Zehnder modulator along lines I-I and II-II of FIG. 4 respectively.
Figure 6:
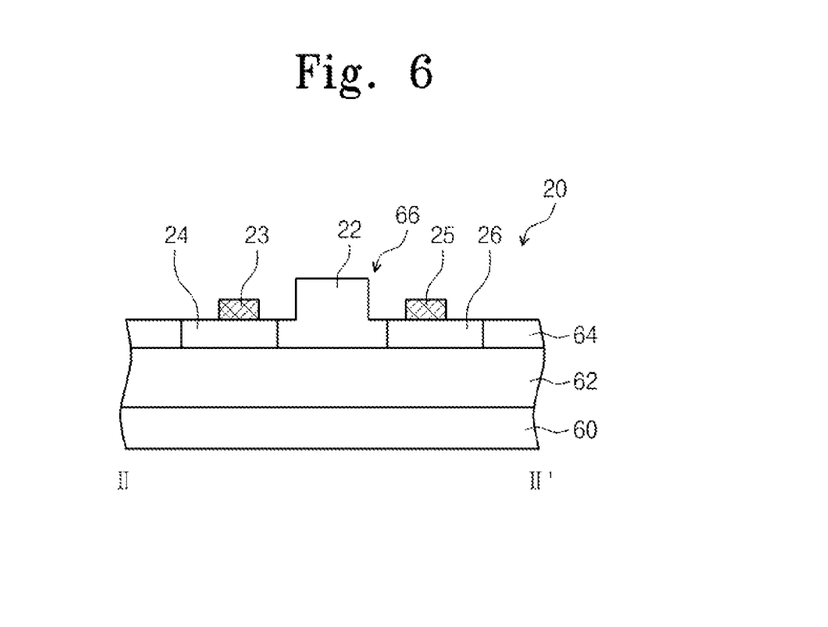

FIG. 4 is a plane view illustrating a Mach-Zehnder modulator according to a second embodiment of the present invention. FIGS. 5 and 6 are cross-sectional views illustrating sections of the Mach-Zehnder modulator along lines I-I and II-II of FIG. 4 respectively.

Referring to FIGS. 4 to 6, the Mach-Zehnder modulator according to the second embodiment of the present invention may comprise first and second dynamic phase shifters 30 and 40 having second doped regions 54 arranged at both upper parts of a first doped region 52 crossed along upper parts of first and second branch wave guides 14 and 16.

The first and second branch wave guides 14 may comprise the first and second dynamic phase shifters 30 and 40. The first and second dynamic phase shifters 30 and 40 may respectively comprise the first and second doped regions 52 and 54 vertically arranged at the first and second branch wave guides 14 and 16. Also, the first and second dynamic phase shifters 30 and 40 may respectively comprise first and second junctions 35 and 45 which correspond to a boundary surface between the first and second doped regions 52 and 54. The first and second junctions 35 and 45 may be parallel to a substrate 60. The first and second doped regions 52 and 54 may be doped with first and second dopants having different conductivity. The first and second dopants may comprise p-type and n-type dopants. The first doped region 52 and the second doped regions 54 may be arranged as a bipolar transistor of a PNP-type structure or an NPN-type structure from the first dynamic phase shifter 30 to the second dynamic phase shifter 40. Accordingly, the Mach-Zehnder modulator according to the second embodiment of the present invention may become smaller.

The optical wave guide 10 may comprise an input wave guide 12 and an output wave guide 18 where light travels, and the first and second branch wave guides 14 and 16 connected to each other in parallel between the input and output wave guides 12 and 18. The optical wave guide 10 may comprise a slab 64 on a substrate 60 and a rib 66 which protrudes from the slab 64 having a step height. The slab 64 may be evenly arranged in front of the substrate 60. The rib 66 may define the input and output wave guides 12 and 18, and the first and second branch wave guides 14 and 16 of the optical wave guide 10 on the slab 64. The light may travel along the rib 66 and the slab 64 under the rib 66 of the optical wave guide 10. The slab 64 may comprise the first doped region doped with the first dopant. The rib 66 may comprise the second doped regions 54 on the slab 64. Also, the rib 66 may comprise the first and second junctions 35 and 45 which correspond to the boundary surface between the first doped region 52 and the second doped regions 54. That is, the first and second junctions 35 and 45 may be respectively arranged at the rib 66 within the first and second branch wave guides 14 and 16.

The substrate 60 may comprise a clad layer 62. The substrate 60 may comprise a Silicon On Insulator (SOI) substrate. The clad layer 62 may comprise a silicon oxide layer arranged on the substrate 60. The clad layer 62 may comprise the silicon oxide layer for which oxygen has been selectively ion injected to the crystalline silicon substrate 60 or oxidized. The first dynamic phase shifter 30 may be arranged at the first branch wave guide 14. The second dynamic phase shifter 40 may be arranged at the second branch wave guide 16.

Also, for differentiating the light, a static phase shifter 20 may be selectively arranged at one of the first and second branch wave guides 14 and 16. For instance, the static phase shifter 20 may be arranged at the first branch wave guide 14. The static phase shifter 20 may comprise an intrinsic semiconductor part 22 having the substantially same height as the first branch wave guide 14 on the clad layer 62, and first and second semiconductor parts 24 and 26 arranged at both sides of the intrinsic semiconductor part 22. The intrinsic semiconductor part 22 may intersect with one of the first and second branch wave guides 14 and 16. Also, the intrinsic semiconductor part 22 may comprise the same crystalline silicon as the optical wave guide 10. Each of the first and second semiconductor parts 24 and 26 may be arranged at the slab 64 of outside of one of the first and second branch wave guides 14 and 16. Each of the first and second semiconductor parts 24 and 26 may be doped with the first and second dopants having different conductivity.

The static phase shifter 20 may comprise the PIN structure. First and second electrostatic electrodes 23 and 25 may be respectively arranged on the first and second semiconductor parts 24 and 26. Direct current power may be applied to the first and second electrostatic electrodes 23 and 25. The refractive index may be adjusted according to density of the charge which passes through the intrinsic semiconductor part 22 in proportion to the current of the power applied to the first and second electrostatic electrodes 23 and 25. The phase of the incident light divided into the first branch wave guide 14 and the second branch wave guide 16 at the input wave guide 12 of the optical wave guide 10 may be asymmetrically changed by the static phase shifter 20. For instance, the static phase shifter 20 may change the phase of the light which travels through the first branch wave guide 14 as much as $\pi/2$.

The first and second phase shifters 30 and 40 may comprise the first doped region 52 and the crystalline silicon having the first junction 35 and the second junction 45 of the second doped regions 54. The first doped region 52 may be doped with the first dopant of about $1\times10^{17}$ EA/cm$^3$, and the second doped regions 54 may be doped with the second dopant of about $1\times10^{17}$ EA/cm$^3$. The second doped regions 54 may have an upper surface with a higher level than the intrinsic semiconductor part 22 and the optical wave guide 10. The first and second junctions 35 and 45 may be arranged at the substantially same level on the substrate 60.

A common electrode 56 may be arranged on the first doped region 52 between the first and second branch wave guides 14 and 16. First and second signal electrodes 36 and 46 may be arranged on the second doped regions 54. The first and second dynamic phase shifters 30 and 40 share the common electrode 56 arranged between the first and second signal electrodes 36 and 46. Accordingly, the Mach-Zehnder modulator according to the second embodiment of the present invention may become smaller.

The first and second dynamic phase shifters 30 and 40 may be applied with high frequency alternating current power having opposite potentials centering around the common electrode 56. The first and second dynamic phase shifters 30 and 40 may change a phase of the light which travels through the first and second branch wave guides 14 and 16 of the optical wave guides 10. The first and second dynamic phase shifters 30 and 40 may change the phase of the light by difference of the refractive index generated due to charges concentrated at the first and second junctions 35 and 45. The first and second dynamic phase shifters 30 and 40 may comprise first and second depletion regions 34 and 44 induced from the first and second junctions 35 and 45.

The first and second depletion regions 34 and 44 may be respectively induced from the first and second junctions 35 and 45. A charge density of about $5\times10^{17}$ EA/cm$^3$ of electrons and holes may be concentrated to the first and second depletion regions 34 and 44. The first and second depletion regions 34 and 44 may change the refractive index of the light which travels along the first and second branch wave guides 14 and 15 of the optical wave guide 10 respectively. The light which travels through the first and second depletion regions 34 and 44 may correspond to the wave functions such as Equations (1) and (2) respectively. The light which passes through the first dynamic phase shifter 30 may have a phase difference which is proportional to a refractive index difference between the first branch wave guide 14 and the first depletion region 34. Also, the light passed through the second dynamic phase shifter 40 may have the phase difference which is proportional to the refractive index difference between the second branch wave guide 16 and the second depletion region 44. The phase differences of the light at the first and second dynamic phase shifters 30 and 40 may be opposite to each other.

For instance, if the phase difference at the first dynamic phase shifter 30 is increased, the phase difference at the second dynamic phase shifter 40 may be reduced. On the contrary, if the phase difference at the first dynamic phase shifter 30 is reduced, the phase difference at the second dynamic phase shifter 40 may be increased. Accordingly, the refractive index difference of the first branch wave guide 14 and the first depletion region 34, or the refractive index difference of the second branch wave guide 16 and the second depletion region 44 has the same size. Also, the refractive index variance of the first branch wave guide 14 and the first depletion region 34, and the refractive index variance of the second branch wave guide 16 and the second depletion region 44 may occur in opposite direction. According to Equation (3), the light interfered at the output wave guide 18 of the optical wave guide 10 may have the phase difference which is proportional to a double ($24n$) of the refractive index difference at the first branch wave guide 14 and the first depletion region 34. The refractive index difference of the first branch wave guide 14 and the first depletion region 34 may be expressed as Equation (4).

Meanwhile, the light which travels along the first branch wave guide 14, and the light which travels along the second branch wave guide 16 may be interfered at the output wave guide 18 of the optical wave guide 10. The light may be destructively interfered or constructively interfered at the output wave guide 18 according to a signal inputted to the first and second dynamic phase shifters 30 and 40.

In response to a signal 1, the first and second dynamic phase shifters 30 and 40 may change the phase of the light as much as $\pi/4$ and $-\pi/4$ respectively. The light which has passed through the first branch wave guide 14 may be changed to a phase of $3\pi/4$. The light which travels through the second branch wave guide 16 may be changed to a phase of $-\pi/4$ at the second dynamic phase shifter 40. Accordingly, since the phase difference of the light which has respectively passed through the first and second branch wave guides 14 and 16 is $\pi$, the light may be extinct by the destructive interference at the output wave guide 18 of the optical wave guide 10.

Also, in response to a signal 0, the first and second dynamic phase shifters 30 and 40 may change the phase of the light as much as $-\pi/4$ and $\pi/4$ respectively. The light which has passed through the first branch wave guide 14 may be changed to a phase of $\pi/4$. The light which travels through the second branch wave guide 16 may be changed to a phase of $\pi/4$ at the second dynamic phase shifter 40. Accordingly, since the light which has respectively passed through the first and second branch wave guides 14 and 16 has no phase difference, the amplitude may be increased by the constructive interference at the output wave guide 18 of the optical wave guide 10.

Therefore, the Mach-Zehnder modulator according to the second embodiment of the present invention can modulate the light which travels through the optical wave guide 10 with high speed and high efficiency by using the high frequency power applied to the first and second dynamic phase shifters 30 and 40.

As above-described, according to the embodiments of the present invention, since the first doped regions connected between the first and second branch wave guides are shared by the first and second dynamic phase shifters, the modulator can be smaller.

Also, the light which travels through the optical wave guide can be modulated with high speed and high efficiency by using the high frequency power applied to the first and second dynamic phase shifters.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A Mach-Zehnder modulator, comprising:
   an input wave guide and an output wave guide arranged over a substrate;
   a first branch wave guide and a second branch wave guide coupled in parallel between the input and output wave guides; and
   a connecting region coupled to and disposed between the first branch wave guide and the second branch wave guide and doped with a first dopant;
   first doped regions disposed on first and second sides of the connecting region and doped with the first dopant;
   second doped regions disposed on the first and second sides of the connecting region and doped with a second dopant having a different conductivity from the first dopant;
   a first junction corresponding to a boundary of the first doped region disposed on the first side of the connecting region and the second doped region disposed on the first side of the connecting region; and
   a second junction corresponding to a boundary of the first doped region disposed on the second side of the connecting region and the second doped region disposed on the second side of the connecting region.

2. The Mach-Zehnder modulator of claim 1, further comprising a slab arranged over the substrate and first and second ribs protruding from the slab.

3. The Mach-Zehnder modulator of claim 2, further comprising a common electrode formed on the connecting region between the first and second branch wave guides.

4. The Mach-Zehnder modulator of claim 3, further comprising first and second electrodes electrically connected to the second doped regions.

5. The Mach-Zehnder modulator of claim 4, wherein the first and second junctions are not parallel to the substrate.

6. The Mach-Zehnder modulator of claim 5, wherein each of the first and second junctions is provided within each of the first and second ribs, respectively, which correspond to each of the first and second branch wave guides, respectively.

7. The Mach-Zehnder modulator of claim 6, wherein the first and second electrodes are arranged over the second doped regions of the first and second branch wave guides, respectively.

8. The Mach-Zehnder modulator of claim 4, wherein the first and second junctions are parallel to the substrate.

9. The Mach-Zehnder modulator of claim 8, wherein each of the first and second junctions is arranged within each of the first and second ribs, respectively, which correspond to each of the first and second branch wave guides, respectively.

10. The Mach-Zehnder modulator of claim 9, wherein the first and second electrodes are provided over the first and second ribs of the first and second branch wave guides, respectively.

11. The Mach-Zehnder modulator of claim 2, further comprising a static phase shifter arranged at one of the first and second branch wave guides.

12. The Mach-Zehnder modulator of claim 11, wherein the static phase shifter comprises an intrinsic semiconductor part and first and second semiconductor parts arranged at both sides of the intrinsic semiconductor part.

13. The Mach-Zehnder modulator of claim 12, wherein the intrinsic semiconductor part comprises a portion of one of the first and second ribs and a portion of the slab under the portion of one of the first and second ribs.

14. The Mach-Zehnder modulator of claim 13, wherein the first and second semiconductor parts are coplanar with a portion of the slab which is adjacent to one of the first and second branch wave guides.

15. The Mach-Zehnder modulator of claim 14, wherein one of the first and second semiconductor parts is doped with the first dopant, and the other is doped with the second dopant.

16. The Mach-Zehnder modulator of claim 1, wherein the second doped regions are doped with dopants of about $1 \times 10^{17}$ impurity atoms/cm$^3$.

* * * * *